United States Patent [19]

Simpson et al.

[11] Patent Number: 4,737,403

[45] Date of Patent: Apr. 12, 1988

[54] METHOD OF COATING FIBER-REINFORCED PLASTIC SUBSTRATES

[75] Inventors: Dennis A. Simpson, Koppel; Samuel Porter, Jr., Natrona Heights, both of Pa.

[73] Assignee: PPG Industries, Inc., Pittsburgh, Pa.

[21] Appl. No.: 33,945

[22] Filed: Apr. 3, 1987

[51] Int. Cl.$^4$ .......................... B32B 7/00; B05D 3/02
[52] U.S. Cl. .................. 428/273; 427/389.8; 427/407.3; 478/415
[58] Field of Search ............... 428/273, 415; 427/389.8, 407.3

[56] References Cited

U.S. PATENT DOCUMENTS

| | | | |
|---|---|---|---|
| 3,184,527 | 5/1965 | Fischer | 264/255 |
| 3,616,185 | 10/1971 | Goldberg | 427/407.3 X |
| 3,794,555 | 2/1974 | Sanjana | 428/273 |
| 3,850,674 | 11/1974 | Clark, Jr. et al. | 427/407.3 |
| 4,029,845 | 6/1977 | Nomura | 428/415 |
| 4,081,578 | 3/1978 | van Essen et al. | 428/63 |
| 4,107,116 | 8/1978 | Riew et al. | 525/121 X |
| 4,189,517 | 2/1980 | Shanoski et al. | 428/423.7 |
| 4,239,808 | 12/1980 | Arnason | 428/482 |
| 4,242,406 | 12/1980 | El Bouhnini et al. | 428/415 X |
| 4,346,144 | 8/1982 | Craven | 428/335 |
| 4,650,718 | 3/1987 | Simpson et al. | 428/413 |

*Primary Examiner*—Thurman K. Page
*Attorney, Agent, or Firm*—William J. Uhl

[57] ABSTRACT

A method of coating a fiber-reinforced plastic substrate is disclosed. The method comprises the application of a primer coat directly to the fiber-reinforced plastic substrate. The primer is an organic resinous composition comprising a polyepoxide and a polyacid curing agent. A topcoat is then applied to the primer coat. The composite coating using the polyepoxide-polyacid primer provides for coated fiber-reinforced plastic substrates with excellent appearance as well as good chip resistance and adhesion, as well as tolerance to overbaking conditions.

17 Claims, No Drawings

METHOD OF COATING FIBER-REINFORCED PLASTIC SUBSTRATES

BACKGROUND OF THE INVENTION

Field of the Invention

The present invention relates to a method of coating a fiber-reinforced plastic substrate, more particularly, to a method of applying a composite coating comprising a primer and a topcoat to the fiber-reinforced plastic substrate.

Brief Description of the Prior Art

Fiber-reinforced plastic is becoming an increasingly important material for the construction of automobiles and trucks. The materials most commonly used are resins such as polyesters which are reinforced with glass fibers. The mixture of resin and fibers is formed into a mass called bulk molding compound (BMC) or a sheet commonly called sheet molding compound (SMC). The SMC or BMC is compression molded to form the desired part.

Although the fiber-reinforced plastic parts have many advantages for automobile and truck usage, namely, they are strong, light in weight and do not rust, they also have some serious disadvantages associated with them. One disadvantage is that it is difficult to coat the fiber-reinforced plastic part and provide coatings with excellent appearance and good coating properties. The fiber-reinforced plastic parts have many surface imperfections, that is, porosity and microcracking, in the surface of the coating and surface depressions commonly called sink marks. It is very difficult to coat this type of substrate and achieve the same smooth glossy surface finishes as would be obtained with the painting of steel sheet. Even though the substrate is primed, many of the imperfections show through the primer and topcoat and are visible to the eye. Also, coating properties such as adhesion and stone chip resistance are often not as good when the coating is applied to a fiber-reinforced plastic as compared to application over steel.

To overcome some of these problems, the compression molders have been priming the fiber-reinforced plastic substrates with so-called "in-mold" coatings. In using these coatings, the mold containing the fiber-reinforced plastic part is partially opened during the molding cycle and the coating composition charged to the mold. The mold is closed and pressure applied to cause the coating to cover and to adhere to the substrate. Examples of "in-mold" coatings and their application methods are described in U.S. Pat. Nos. 4,189,517 and 4,086,578.

In-mold primers are difficult to work with requiring interruption of the molding cycle and charging a partially open mold with coating composition, a difficult procedure. Also, many of the in-mold primers are based on polyisocyanate resins which are toxic materials and are difficult to handle in a safe, healthful manner.

It would be easier to simply apply the primer directly to the fiber-reinforced plastic substrate at ambient conditions of pressure. Although there are commercially available compositions which can be applied in this manner, they also have shortcomings associated with them. One shortcoming is their sensitivity to overbake conditions. Usually, the coatings are cured at relatively low temperatures, that is, 225°–325° F. (107°–163° C.). The cured coating may then be exposed to higher temperatures which will adversely affect the properties of the primer such as its adhesion to the substrate. For example, the fiber-reinforced parts may be primed and cured at low temperature, i.e., 25°–325° F. (107°–163° C.) and then assembled to the automobile prior to electrodeposition. In this case, the primer must be able to withstand the higher curing temperatures for the electrodeposition coating, i.e., 40°–390° F. (171°–199° C.).

Therefore, it would be desirable to provide a primer which could be cured at a relatively low temperature, yet maintain its properties when subjected to higher temperatures.

SUMMARY OF THE INVENTION

In accordance with the present invention, a method of applying a composite coating to a fiber-reinforced plastic substrate is provided. The method comprises applying directly to a surface of the substrate a primer coating composition comprising a polyepoxide and a polyacid curing agent and forming a continuous primer coat on the surface of the substrate, applying directly to the primer coat a topcoating composition and forming a continuous topcoat on the primer coat.

The primer composition provides excellent priming and sealing properties to the fiber-reinforced plastic substrate in that the appearance of the finishing coat is excellent with high gloss and distinctness of image. Also, the stone chip resistance of the composite coating as well as the adhesion of the primer to the substrate is good and these properties are maintained when the primer is subjected to overbake conditions.

DETAILED DESCRIPTION

The primer coating composition used in the method of the invention is based on a crosslinkable resinous composition comprising a polyepoxide and a polyacid curing agent. Among the polyepoxides which can be used are epoxy-containing acrylic polymers, which are preferred, epoxy condensation polymers such as polyglycidyl ethers of alcohols and phenols, and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups. Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 carbon atoms in the alkyl group. Specific examples of these acrylates and methacrylates include methyl methacrylate, ethyl methacrylate, butyl methacrylate, ethyl acrylate, butyl acrylate and 2-ethylhexyl acrylate.

Examples of other copolymerizable ethylenically unsaturated monomers are vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

Acid group-containing polymerizable ethylenically unsaturated monomers such as acrylic and methacrylic acid are preferably not used because of possible reactivity of the epoxy and acid group.

The epoxy group-containing ethylenically unsaturated monomer is preferably used in amounts of about 5 to 60, more preferably from 20 to 50 percent by weight of the total monomers used in preparing the epoxy-containing acrylic polymer. Of the remaining polymerizable ethylenically unsaturated monomers, preferably 40 to 95 percent, more preferably 50 to 80 percent by weight, of the total monomers are the alkyl esters of acrylic and methacrylic acid. In preparing the epoxy-containing acrylic polymer, the epoxy functional monomers and other ethylenically unsaturated monomers can be mixed and reacted by conventional free radical initiated organic solution polymerization techniques in the presence of suitable catalysts such as organic peroxides or azo compounds, for example, benzoyl peroxide or N,N'-azobis(isobutyronitrile). The polymerization can be carried out in an organic solution in which the monomers are soluble. Suitable solvents are aromatic solvents such as xylene and toluene as well as mixed aromatic solvents such as those commercially available as SOLVESSO 100, and ketones such as methyl amyl ketone.

The epoxy-containing acrylic polymer typically has a number average molecular weight between 1000 and 20,000, preferably 1000 to 10,000, and more preferably 1000 to 5000. The molecular weight is determined by gel permeation chromatography using a polystyrene standard. In determining molecular weights in this fashion, it is not the actual molecular weights which are measured but an indication of the molecular weights as compared to polystyrene. The values which are obtained are commonly referred to as polystyrene numbers. However, for the purposes of this invention, they are referred to as molecular weights.

The epoxy condensation polymers which are used are polyepoxides, that is, those having a 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol or with an epihalohydrin such as epichlorohydrin in the presence of alkali.

Examples of suitable polyphenols are 2,2-bis(4-hydroxyphenyl)-propane, commonly called bisphenol A, 1,1-bis(4-hydroxyphenyl)ethane and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used. Besides the epoxy-containing polymers described above, certain polyepoxide monomers and oligomers can also be used. Examples of these materials are described in U.S. Pat. No. 4,102,942 in column 3, lines 1-16. Specific examples of such low molecular weight polyepoxides are 3,4-epoxycyclohexylmethyl 3,4-epoxycyclohexane carboxylate and bis(3,4-epoxy-6-methylcyclohexyl-methyl)-adipate, These materials are aliphatic polyepoxides as are the epoxycontaining acrylic polymers.

Preferably, the polyepoxides are those which have a glass transition temperature less than 50° C., preferably less than 30° C. The glass transition temperature (Tg) is described in *PRINCIPLES OF POLYMER CHEMISTRY*, Flory, Cornell University Press, Ithaca, NY, 1953, pages 52–57. The Tg can be calculated as described by Fox in *Bull. Amer. Physic Soc.*, 1, 3, page 123 (1956). The Tg can be determined experimentally such as by using a penetrometer such as a DuPont 940 Thermomedian Analyzer. The Tg of the polymers as used herein refers to the calculated values unless otherwise indicated.

A polyepoxide is present in the liquid crosslinkable composition in amounts of about 10 to 90, preferably from 25 to 75 weight based on total weight of resin solids.

In addition to the polyepoxide, the primer coating composition also contains a polyacid curing agent which contains 2 or more acid groups per molecule which is reactive with the polyepoxide to form a crosslinked coating as indicated by its resistance to organic solvent. The acid functionality is preferably a carboxylic acid although acids such as sulfonic acid may be used but their use is not preferred. Preferably, the polyacid curing agent is a carboxyl-terminated material having at least 2 carboxyl groups per molecule. Among the polyacid curing agents which may be used are carboxylic acid group-containing polymers such as acrylic polymers, polyesters and polyurethanes, and oligomers such as ester group-containing oligomers, and monomers.

The preferred curing agents are ester group-containing oligomers formed from reacting polyols and 1,2-acid anhydrides. The half-esters are preferred because they are relatively low molecular weight and are quite reactive with epoxy functionality enabling the formation of fluid compositions while maintaining outstanding properties.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide low volatile organic contents in the coating composition while still providing for excellent properties in the resultant coating. By substantially no polyesterification occurring means that the carboxyl groups of the anhydride are not esterified by the polyol in a recurring manner. By this is meant that less than 10, preferably less than 5 percent by weight of the polyester is formed.

Two reactions may occur in combining the anhydride and the polyol together under suitable reaction conditions. The desired reaction mode involves ring opening of the anhydride ring with the hydroxyl, that is,

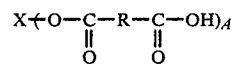

where X is a residue of a polyol after reaction with a 1,2-dicarboxylic acid anhydride, R is an organic moiety associated with the anhydride and A is equal to at least 2. Subsequently, carboxyl groups formed by opening of the anhydride ring may react with hydroxyl groups to give off water via condensation reaction. This latter reaction is not desired since it can lead to a polycondensation reaction leading to products with higher molecular weights.

To achieve the desired reaction, the 1,2-acid anhydride and polyol are co-reacted together by mixing the two ingredients together in a reaction vessel. Preferably, reaction is conducted in the presence of an inert atmosphere such as nitrogen and in the presence of a solvent to dissolve the solid ingredients and to lower the viscosity of the reaction mixture. Examples of suitable solvents are high boiling materials and include, for example, ketones such as methyl amyl ketone, diisobutyl ketone, methyl isobutyl ketone, aromatic hydrocarbons such as toluene and xylene as well as other organic solvents such as dimethylformamide and N-methyl-pyrrolidone.

For the desired ring opening reaction and half-ester formation, a 1,2-carboxylic acid anhydride is used. Reactions of a polyol with a carboxylic acid instead of an anhydride would require esterification by condensation eliminating water which would have to be removed by distillation. Under these conditions this would promote undesired polyesterification. Also, the reaction temperature is preferably low, that is, no greater than 135° C., preferably less than 120° C., usually within the range of 70°–135° C., preferably 90°–120° C. Temperatures greater than 135° C. are undesirable because they promote polyesterification, whereas temperatures less than 70° C. are undesirable because of sluggish reaction. The time of reaction can vary somewhat depending principally upon the temperature of reaction. Usually the reaction time will be from as low as 10 minutes to as high as 24 hours.

The equivalent ratio of anhydride to hydroxyl on the polyol is preferably at least about 0.8:1 (the anhydride being considered monofunctional) to obtain maximum conversion to the desired half-ester. Ratios less than 0.8:1 can be used but such ratios result in increased formation of less preferred half-esters.

Among the anhydrides which can be used in the formation of the desired polyesters are those which, exclusive of the carbon atoms and anhydride moiety, contain from 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkylhexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride. Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3,-butanetriol 1,6-hexanediol, neopentyl glycol, diethylene glycol, dipropylene glycol, 1,4-cyclohexanedimethanol, trimethylolpropane, 2,2,4-trimethylpentane1,3-diol, pentaerythritol and 1,2,3,4-butanetetrol. Aromatic polyols such as bisphenol A and bis(hydroxymethyl)xylene can also be used.

In addition to the acid group-containing polymers and oligomers mentioned above, monomers containing at least 2 acid groups can be used. Examples of suitable monomeric polycarboxylic acids are those containing from 5 to 20 carbon atoms and include open chain cyclic, saturated, unsaturated and aromatic acids. Examples include succinic acid, adipic acid, azelaic acid, sebacic acid, hexahydrophthalic acid, maleic acid, cyclohexane-1,2-dicarboxylic acid and phthalic acid.

The polyacid curing agent is present in the coating composition in amounts of about 10 to 90, preferably 25 to 75 percent by weight, based on total weight of resin solids.

The polyepoxide-polyacid composition may optionally contain an anhydride, preferably an anhydride which is a liquid at 25° C. The presence of such an anhydride improves the cure response. Examples of suitable anhydrides include alkyl-substituted hexahydrophthalic anhydrides wherein the alkyl group contains up to 7 carbons, more preferably up to 4 carbons, such as methyl hexahydrophthalic anhydride and dodecenyl succinic anhydride. The amount of anhydride which is used can vary from 0 to 40, preferably from 5 to 25 percent by weight, based on total weight of resin solids.

The equivalent ratio of carboxyl to epoxy in the composition is preferably about 0.3 to 3.0, preferably from 0.8 to 1.5 equivalents of carboxyl (anhydride being considered monofunctional) per equivalent of epoxy.

Optionally, the crosslinkable compositions can contain silane functionality which can be incorporated into the composition by using a reactive silane group-containing material such as gamma-methacryloxypropyltrimethoxysilane or mercaptopropyltrimethoxysilane which can be used in the preparation of the epoxy-containing acrylic polymers. Such materials co-react with the polymerizing monomers forming a polymer with silane curing groups. Alternately, a silane group-containing material such as methyltrimethoxysilane can be included in the composition.

The primer compositions will also preferably contain a catalyst to accelerate the cure through the epoxy-acid reaction. Examples of suitable catalysts are basic materials and include organic amines and quaternary ammonium compounds such as pyridine, piperidine, dimethylaniline, diethylenetriamine, tetramethyl ammonium chloride, tetramethyl ammonium acetate, tetramethylbenzyl ammonium acetate, tetrabutyl ammonium fluoride and tetrabutyl ammonium bromide. The amount of catalyst is typically from 0 to 10, preferably 0.5 to 3 percent by weight based on weight of resin solids.

The coating compositions of the present invention usually also contain an organic solvent which is volatile and is removed after the coating is applied and cured. A solvent is needed to reduce the viscosity sufficiently to enable forces available and simple coating techniques, namely, spraying, to spread the coating to the controllable, desired and uniform thickness. Also, solvents assist in substrate wetting, resinous component compatibility, package stability and coalescence or film formation. Examples of suitable solvents are those which do not contain groups which are reactive with either the epoxy or the acid functionality and include aromatic hydrocarbons such as toluene and xylene, ketones such as methyl ethyl ketone and methyl isobutyl ketone, esters such as hexyl acetate and heptyl acetate and ethers such as the dialkyl ethers of ethylene glycol, diethylene glycol and propylene glycol. Usually, the organic solvent is present in amounts of up to 55 percent by weight, usually about 30 to 55 percent by weight based on total weight of organic solvent and resin solids.

Also, the composition normally will contain a pigment. Pigments may be of the conventional types including carbon black, titanium dioxide and clay. The pigment content of the paint is usually expressed as the pigment to resin weight ratio. In the practice of the invention when the primer composition does contain a pigment, the pigment to resin weight ratio may be as high as 2.5:1 and for most pigmented coatings it is within the range of 0.1 to 2:1.

The primer coating composition may also contain optional ingredients such as aminoplasts, plasticizers, flow control agents and other formulating additives. If these ingredients are present, they are usually present in amounts of up to 40 percent by weight based on total weight of the primer coating composition.

The present invention is particularly useful in coating compression molded and fiber-reinforced plastics and primarily the polyester variety which are known in the art as bulk molding compounds (BMC) or sheet molding compounds (SMC). Such materials are described in numerous publications and patents including the annually published *Modern Plastics Encyclopedia, The Encyclopedia of Chemical Technology*, Kirk-Othmer, 2nd edition, Vol. 20, pages 791-839, Interscience, 1969, as well as U.S. Pat. No. 3,184,527. It is to be appreciated, however, that the processes seem to be useful with other compression and injection molded plastics both thermosetting and thermoplastic, namely, epoxies, phenolics, silicones, aminoplasts, polyurethanes, polyethylene, polystyrene, polypropylene, thermoplastic acrylics, polyvinyl chloride and various polymers and various copolymers of acrylonitrile and polybutadiene. Also, fibers other than glass fibers, for example, boron fibers, may be used.

The primer coating composition can be applied to the substrate by any of the conventional coating techniques such as brushing, spraying, dipping or flowing, but it is preferred that spray application be used. Any of the known spray techniques may be employed such as compressed air spraying, electrostatic spraying, in either manual or automatic methods. If spraying is used, the viscosity of the primer coating composition should be adjusted with additional solvent if necessary such that it has a No. 4 Ford cup viscosity of 12-25 seconds, usually on the order of about 18 seconds at 75° F. (24° C.).

The substrate is coated at room temperature or preferably at elevated temperature. Heating the substrate prior to coating releases volatiles which are often entrapped in the substrate. The polyepoxide-polyacid compositions of the invention can be applied directly to the preheated substrate without a cool down period. This is an advantage of the present invention over the prior art in that many of the primer compositions of the prior art cannot be applied directly to the heated substrate. The substrate often has depressions and craters. When the coating composition flows into these areas, it forms a thick film which cures quickly because of the heated surface. The volatiles in the coating composition cannot escape from the quickly curing film, and as a result, the film "pops". The epoxy-acid compositions of the present invention are resistant to popping under these conditions. Typically, the substrate can be heated to at least 150° F. (66° C.), usually at about 250° F. (121° C.) for about 10 to 40 minutes before application of the primer coating.

After the coating composition has been applied to the substrate, the composition is heated to cure the coating.

In the curing operation, the solvents are driven off, a substantially continuous coating is formed, and the coating is crosslinked through the epoxy-acid reaction. The heating operation is usually at low temperatures. Typically, temperatures from as low as 225° F. (107° C.) to as high as 325° F. (163° C.) can be used. However, the coating can be exposed to higher temperatures, as high as 400° F. (204° C.) without adverse effects. The time for curing is typically from about 15 to 60 minutes, more normally on the order of about 20 to 40 minutes. The thickness of the cured primer coating is typically from about 0.2 to 10 and preferably from about 0.5 to 2 mils.

After the primer has been applied to the fiber-reinforced plastic substrate and cured, a finishing or topcoat is applied directly to the primer coat. The finishing coat can be any of the compositions known in the art for automotive applications. These compositions comprise a resinous binder and a pigment. Particularly useful resinous binders are acrylic polymers, polyesters, including alkyds and polyurethanes.

The pigments useful in the finishing coat include color pigments normally used in automotive applications such as titanium dioxide, iron oxide, chromium oxide, lead chromate and carbon black, and organic pigments such as phthalocyanine blue and phthalocyanine green. If desired, metallic pigments such as aluminum flake and metal oxide encapsulated micas can also be used in the finishing coat. Typically, the pigment is incorporated in the coating composition in amounts of about 0.5 to 25 percent by weight based on total weight of the finishing coat. If desired, the finishing coat may additionally contain other materials such as flow control agents, anti-oxidants, U.V. light absorbers and the like. These optional ingredients are typically present in amounts of up to 25 percent by weight based on total resin solids.

The finishing coats can be applied to the primer by conventional means such as brushing, spraying, flow coating and the like, but they are most often applied by spraying. The usual spray techniques and equipment for air spraying, electrostatic spraying in either manual or automatic methods can be used.

After application of the finishing coat to the basecoat, it is heated to coalesce and cure the coating. In the coating operation, solvents are driven off, a substantially continuous coating is formed and the coating is crosslinked. Typically, heating is from 180° to 325° F. (82° to 163° C.) for about 15 to 60 minutes depending upon the resinous vehicle and curing agent which are present in the finishing coat. Film thicknesses for the finishing coat are typically on the order of 1 to 5 mils.

The finishing coat can be applied as a one-coat system or alternately can be applied as a so-called color-clear system in which the pigmented or colored basecoat is first applied to the primer followed by the application of a clear topcoat over the colored basecoat. Such systems are being increasingly used in the automotive industry since they provide for excellent depth of color in the underlying basecoat as well as outstanding gloss, distinctness of image and durability in the coating.

The invention is illustrated by reference to the following examples wherein parts are parts by weight unless otherwise indicated.

EXAMPLES

The examples show the preparation of various epoxy-acid curable primer compositions and applications of the primers to SMC substrates and topcoating of the primed SMC substrate with automotive quality topcoats. The coated SMC substrates were evaluated for appearance, adhesion, stone chip resistance and were also compared to similarly coated substrates which used commercially available primers.

The following examples (A–D) show the preparation of a polyepoxide and various polyacid curing agents.

EXAMPLE A

An epoxy-containing acrylic polymer was prepared from the following mixture of ingredients:

| Ingredients | Weight (in grams) | Percentage by Weight |
|---|---|---|
| Hexyl acetate | 2633.3 | — |
| Glycidyl methacrylate | 2000 | 40 |
| Methyl methacrylate | 1150 | 23 |
| Butyl acrylate | 1750 | 35 |
| Styrene | 100 | 2.0 |
| VAZO-67[1] | 150 | 3.0 (on monomers) |
| t-butyl perbenzoate | 100 | 2.0 (on monomers) |
| t-butyl perbenzoate (post addition) | 25 | 0.5 (on monomers) |
| t-butyl perbenzoate (post addition) | 25.0 | 0.5 (on monomers) |

[1]Alpha, alpha'-dimethylazobis(isobutyronitrile) available from E. I. duPont de Nemours and Company.

The hexyl acetate was charged to a suitable reactor and heated to 135° C. The glycidyl methacrylate, methyl methacrylate, butyl acrylate and styrene were mixed together. The VAZO-67, first portion of tertiary-butyl perbenzoate and 500 grams of hexyl acetate were also mixed together. The premixture of vinyl monomers and the premixture of initiators were added simultaneously to the reaction vessel over a 3-hour period while maintaining the reaction mixture at a temperature of 135° C. When the additions were complete, the reaction mixture was held at 135° C. for ½ hour followed by the addition of the second portion of t-butyl perbenzoate and 100 grams of hexyl acetate. The reaction mixture was held for ½ hour at 135° C. followed by the addition of the third portion of t-butyl perbenzoate and 100 grams of hexyl acetate. The reaction mixture was held for 2 hours at 135° C. followed by cooling to room temperature. The reaction mixture was thinned with additional hexyl acetate to get a solids content of 60 percent. The polymer had a number average molecular weight of 2889 and a weight average molecular weight of 7720.

EXAMPLE B

A polyacid half-ester of trimethylolpropane and methylhexahydrophthalic anhydride was prepared from the following mixture of ingredients:

| Ingredients | Parts by Weight (grams) |
|---|---|
| Trimethylolpropane | 1341.0 |
| Methylhexahydrophthalic anhydride | 5040.0 |
| Methyl isobutyl ketone | 2734.7 |

The trimethylolpropane and methyl isobutyl ketone were charged to a suitable reaction vessel and heated under a nitrogen atmosphere to 115° C. The methylhexahydrophthalic anhydride was charged over a 2-hour period while maintaining the temperature between 112°–117° C. The reaction mixture was held at this temperature for about 3 hours and then cooled to room temperature and found to have a solids content at 110° C. of 69 percent and an acid value of 200.3.

EXAMPLE C

A polyacid half-ester of 1,6-hexanediol-methylhexahydrophthalic anhydride was prepared from the following mixture of ingredients:

| Ingredients | Parts by Weight (grams) |
|---|---|
| 1,6-hexanediol | 590.0 |
| Methylhexahydrophthalic anhydride | 1680.0 |
| Methyl isobutyl ketone | 972.9 |

The 1,6-hexanediol and methyl isobutyl ketone were charged to a reaction vessel and heated under a nitrogen atmosphere to 115° C. The methylhexahydrophthalic anhydride was charged over a 2-hour period while maintaining the reaction temperature between 112°–117° C. The reaction mixture was held at this temperature for about 3 to 4 hours to a stalled acid value, that is, acid value remained essentially constant. The reaction mixture was then cooled to room temperature, found to have a solids content (measured at 110° C. for 2 hours) of 68 percent and an acid value of 176.

EXAMPLE D

A polyacid half-ester of a polycaprolactone polyol-methylhexahydrophthalic anhydride was prepared from the following mixture of ingredients:

| Ingredients | Parts by Weight (grams) |
|---|---|
| TONE 0305[1] | 3258 |
| Methylhexahydrophthalic anhydride | 2963.5 |
| Methyl isobutyl ketone | 2666.4 |

[1]Trimethylolpropane-polycaprolactone reaction product available from Union Carbide Corporation.

The TONE 0305 and methyl isobutyl ketone were charged to a reaction vessel and heated under a nitrogen atmosphere to 115° C. The methylhexahydrophthalic anhydride was added over a period of about 1½ hours while maintaining the reaction temperature at about 115° C. The reaction temperature was cooled to about 100° C. and 622.2 grams of ethanol added. The reaction mixture was heated to reflux and held for about 2 hours.

The reaction mixture was then vacuum stripped at 125° C. with 1528.7 grams of volatiles being removed. The reaction mixture was then thinned with an additional 966.5 grams of methyl isobutyl ketone. The reaction mixture had a solids content of 71.2 and an acid value of 119.

The following examples (E and F) show the preparation of various pigment pastes which were used in formulating primer compositions.

EXAMPLE E

A pigment paste was prepared from the following mixture of ingredients:

| Ingredients | Resin Solids | Pigment Solids | Total Weight |
|---|---|---|---|
| Polyacid of Example B | 25.0 | — | 35.7 |
| Hexyl acetate | — | — | 100.0 |
| TiO₂ | — | 50.0 | 50.0 |
| Barytes clay | — | 40.0 | 40.0 |
| Carbon black | — | 10.0 | 10.0 |
| Methyl isobutyl ketone | — | — | 20.0 |

The ingredients were mixed together and milled in an Eiger mill to a Hegman No. 7+ grind.

EXAMPLE F

A pigment paste was prepared from the following mixture of ingredients:

| Ingredients | Resin Solids | Pigment Solids | Total Weight |
|---|---|---|---|
| Polyacid of Example D | 25.0 | — | 35.7 |
| Hexyl acetate | — | — | 100.0 |
| TiO$_2$ | — | 50.0 | 50.0 |
| Barytes clay | — | 40.0 | 40.0 |
| Carbon black | — | 10.0 | 10.0 |
| Methyl isobutyl ketone | — | — | 20.0 |

The ingredients were mixed together and ground in an Eiger mill to a Hegman No. 7+ grind.

The following examples (1 and 2) show the preparation of various primer compositions based on the polyepoxides, polyacids and pigment pastes of Examples A–F.

EXAMPLE 1

A "polyacid package" was formulated from the following ingredients by mixing the ingredients together in the order indicated with low shear mixing.

| Ingredients | Resin Solids (grams) | Pigment Solids (grams) | Total Weight (grams) |
|---|---|---|---|
| Pigment paste of Example E | 8.75 | 35.0 | 89.5 |
| Polyacid of Example B | 18.55 | — | 26.5 |
| Polyacid of Example C | 9.6 | — | 13.7 |
| ARMEEN DM 12D[1] | 3.0 | — | 3.0 |
| Hexyl acetate | — | — | 17.4 |
| CAB 551.2[2] | 1.0 | — | 4.0 |

[1]N,N—dimethyldodecylamine catalyst available from Akzo Chemical.
[2]25 percent by weight solution of cellulose acetate butyrate available from Eastman Chemical dissolved in a mixture of 35.08 percent by weight 2-ethoxyethyl acetate, 25.2 percent acetone, 8.8 percent toluene and 5.9 percent of a mixed aromatic solvent available from Exxon as SOLVESSO 100.

An "epoxy package" was formulated from the following ingredients by mixing the ingredients together in the order indicated with low shear mixing.

| Ingredients | Resin Solids (grams) | Total Weight (grams) |
|---|---|---|
| Polyepoxide of Example A | 63.1 | 108.0 |
| Hexyl acetate | — | 25.0 |
| Polybutylacrylate[1] (62.5% solids in xylene) | 0.25 | 0.4 |
| CAB 551.2 | 1.0 | 4.0 |

[1]Polybutylacrylate having a M$_w$ of about 10,000 and a M$_n$ of about 2400.

The acid package and epoxy package were mixed together with low shear mixing to form the primer composition which had a No. 4 Ford cup viscosity of 17.5 seconds and a solids content determined at 110° C. of 48.7 percent.

EXAMPLE 2

A polyepoxide-polyacid primer was formulated from the following ingredients:

| Ingredients | Resin Solids (grams) | Pigment Solids (grams) | Total Weight (grams) |
|---|---|---|---|
| Pigment paste of Example F | 8.75 | 35.0 | 89.5 |
| Polyacid of Example D | 40.35 | — | 57.6 |
| ARMEEN DM 12D | 3.0 | — | 3.0 |
| Hexyl acetate | — | — | 36.1 |
| CAB 551.2 | 2.0 | — | 8.0 |
| Polyepoxide of Example A | 50.9 | 87.8 | — |
| Polybutylacrylate | 0.25 | 0.4 | — |

The ingredients were mixed in the order indicated with low shear mixing to form the primer composition.

The primer compositions of Examples 1 and 2 were spray applied directly to SMC substrates (PHASE ALPHA from Ashland Chemical Company). The composition was heated at various temperatures reported in the table below to coalesce the composition and form a continuous film on the substrate at ambient pressure and to cure the film. The cured primers had a thickness in each case of about 1.3 mils. The adhesion of the cured primers to the SMC substrates was determined and is also reported in the table below. An automotive quality topcoat composition was then applied directly to the primer. The topcoat composition was a color-clear system in which the color coat or basecoat composition, available from PPG Industries, Inc. as UBC 8553, was first spray applied directly to the primer coat. The basecoat was given an air flash at ambient temperature for about 2 minutes and then a clear coating composition available from PPG Industries, Inc. as DCT-2000 was spray applied to the basecoat. The composite coating was then heated at 250° F. (121° C.) for 30 minutes to coalesce and cure the topcoat. The gloss, distinctness of image and chip resistance of the coating are reported in the table below.

For the purposes of comparison, commercially available primers for SMC were also evaluated. The primers were applied to the SMC substrate and topcoated as described above. The properties of these comparative coatings are also reported in the table below.

TABLE

Primer and Topcoat Properties Over SMC

| Primer | Primer Bake Temperature °F. for 30 minutes | Chip Resistance[1] | Adhesion of Primer to SMC[2] | Gloss[3] | DOI[4] |
|---|---|---|---|---|---|
| Example 1 | 250 | 4 | 5 | 93 | 95 |
| Example 1 | 325 | 5 | 4 | 90 | 95 |
| Example 1 | 390 | 5 | 4 | 92 | 95 |
| Example 2 | 250 | 4 | 4 | 90 | 95 |
| Example 2 | 325 | 6 | 4 | 92 | 95 |
| Example 2 | 390 | 6 | 4 | 93 | 95 |
| POLANE[5] | 250 | 6 | 5 | 91 | 95 |
| POLANE | 325 | 5 | 4 | 94 | 95 |
| POLANE | 390 | 0 | 4 | 91 | 95 |

TABLE-continued

| | Primer and Topcoat Properties Over SMC | | | | |
|---|---|---|---|---|---|
| Primer | Primer Bake Temperature °F. for 30 minutes | Chip Resistance[1] | Adhesion of Primer to SMC[2] | Gloss[3] | DOI[4] |
| Siebert[6] | 250 | 1 | 3 | 92 | 95 |
| Siebert | 325 | 6 | 3 | 92 | 95 |
| Siebert | 390 | 4 | 3 | 92 | 95 |

[1]Chip resistance determined with a Gravelometer, Model QGR from the Q Panel Co. The chip resistance test is conducted generally in accordance with the procedure of ASTM D3170-74 except the painted panel was chilled at −10° F. instead of 10° F., and more detailed photographic standards were used. Ratings are from 0 to 9 with 0 being a failure (large sections of paint chipped off) and 9 being good with very little, if any, of the paint chipping off.
[2]ASTM D-3359; the higher the value, the better the adhesion.
[3]Measured with a 20° gloss meter manufactured by Gardner Instrument Company.
[4]Distinctness of image determined on a C-Box manufactured by C-Box-I[2]R Company.
[5]Two-package coating for SMC from Sherwin-Williams Company.
[6]SMC primer coating from Siebert Oxadermo Co.

The data summarized in the table above shows that the compositions used in accordance with the present invention provide coated SMC substrates with outstanding gloss and DOI's and acceptable stone chip resistance and adhesion over a wide baking temperature range. The coated article prepared using the POLANE primer was defective in stone chip resistance at 390° F., whereas the Siebert primer resulted in poor stone chip resistance at 250° F. and had relatively poor adhesion.

We claim:

1. A method of applying a composite coating to a fiber-reinforced plastic substrate comprising:
   (A) applying directly to a surface of said substrate a primer coating composition comprising a polyepoxide and a polyacid curing agent and forming a continuous primer coat on the surface of the substrate, and
   (B) applying directly to the primer coat a topcoating composition and forming a continuous topcoat on the primer coat.

2. The method of claim 1 in which the fiber-reinforced plastic substrate is fiberglass-reinforced polyester substrate.

3. The method of claim 1 in which the polyepoxide is a copolymer of a monoethylenically unsaturated monomer having at least one epoxy group and at least one monoethylenically unsaturated monomer which is free of epoxy groups.

4. The method of claim 3 in which the copolymer has a number average molecular weight of between 1000 and 20,000.

5. The method of claim 4 in which the copolymer is a copolymer of glycidyl acrylate or methacrylate with at least one other copolymerizable ethylenically unsaturated monomer.

6. The method of claim 5 in which the other copolymerizable ethylenically unsaturated monomer comprises at least in part an alkyl ester of acrylic or methacrylic acid containing from 1 to 20 carbon atoms in the alkyl group.

7. The method of claim 5 in which the glycidyl acrylate or methacrylate comprises from 5 to 60 percent of the monomers used in preparing the epoxy-containing acrylic polymer.

8. The method of claim 3 in which the epoxy group-containing acrylic polymer is present in the crosslinkable composition in amounts of 10 to 90 percent by weight based on total weight of resin solids.

9. The method of claim 1 in which the polyacid curing agent is a carboxyl-terminated material having at least 2 carboxyl groups per molecule.

10. The method of claim 9 in which the polyacid curing agent is a carboxyl-terminated polyester.

11. The method of claim 10 in which the carboxyl-terminated polyester is a half-ester of the structure:

$$X(-O-\underset{\underset{O}{\|}}{C}-R-\underset{\underset{O}{\|}}{C}-OH)_A$$

where X is the residue of a polyol after reaction with a 1,2-dicarboxylic anhydride, R is an organic moiety associated with the anhydride and A is equal to at least 2.

12. The method of claim 1 in which the polyacid curing agent is present in amounts of 10 to 90 percent by weight based on total weight of resin solids.

13. The method of claim 1 in which the equivalent ratio of carboxyl to epoxy is from 0.3 to 3.0:1.

14. The method of claim 1 in which the crosslinkable composition has a resin solids content of at least 45 percent.

15. An article coated by the method of claim 1.

16. An article coated by the method of claim 2.

17. An article coated by the method of claim 11.

* * * * *